(12) United States Patent
Brooke

(10) Patent No.: US 6,192,990 B1
(45) Date of Patent: Feb. 27, 2001

(54) MULTI-DUMP METERING VALVE

(75) Inventor: Peter Leighton Brooke, Delta (CA)

(73) Assignee: Donald Brian Arney, Delta (CA)

( * ) Notice: Subject to any disclaimer, the term of this patent is extended or adjusted under 35 U.S.C. 154(b) by 0 days.

(21) Appl. No.: 09/448,026

(22) Filed: Nov. 23, 1999

(51) Int. Cl.$^7$ ................................................ A62C 29/00
(52) U.S. Cl. ............................ 169/53; 239/171; 244/136; 254/68.2; 251/324
(58) Field of Search .................... 169/51–53, 70, 169/30, 34; 239/171; 244/136; 294/68.2, 68.21, 68.22, 68.25; 251/324

(56) References Cited

U.S. PATENT DOCUMENTS

| | | | |
|---|---|---|---|
| 3,485,302 | * 12/1969 | Thorpe | 169/53 |
| 3,598,342 | * 8/1971 | Hawkshaw | 244/136 |
| 3,661,211 | 5/1972 | Powers | 169/2 R |
| 3,710,868 | 1/1973 | Chadwick | 169/2 A |
| 3,828,857 | * 8/1974 | Mason | 169/53 |
| 4,022,377 | 5/1977 | Wagner et al. | 236/34.5 |
| 4,240,507 | 12/1980 | Hokkanen | 169/53 |
| 5,560,429 | 10/1996 | Needham | 169/53 |
| 5,829,809 | 11/1998 | Arney et al. | 294/68.21 |

* cited by examiner

Primary Examiner—Lesley D. Morris
(74) Attorney, Agent, or Firm—Christie, Parker & Hale, LLP

(57) ABSTRACT

In one aspect, the invention is directed towards a helicopter-carried firefighting device including a valve. The valve has an outer assembly and an inner assembly in which the outer assembly has a reduced surface area on those surfaces which are disposed normally to a direction of movement. The outer assembly therefore may be less affected by hydrostatic and hydrodynamic forces directed so as to oppose its movement. The valve may be located in a reservoir of fluid, and controlled by a control head operated remotely from the helicopter so as to release fluid from the reservoir over a fire. The valve may be symmetrical about a longitudinal axis of the valve, such that transversely directed fluid flows through the valve may be cancelled, producing a coherent, longitudinal fluid flow. The valve may be opened partially so as to operate as a metering valve. The valve may be closed relatively rapidly to retain fluid in the reservoir so as to permit multiple dumps from a single reservoir if so desired.

18 Claims, 8 Drawing Sheets

MULTI-DUMP METERING VALVE

FIELD OF THE INVENTION

The invention pertains to a mechanical valve, which may be used to regulate fluid flow, for example in aerial fire fighting equipment.

BACKGROUND

Helicopter carried dump-buckets are well known for use in fighting forest fires. These buckets, at their simplest, may comprise a rigid or flexible reservoir or body for holding a volume of water, a sling to suspend the reservoir from a helicopter, a valve, and an actuator which is controlled from inside the helicopter to operate the valve to release the water from the reservoir over the fire.

In many existing buckets, the valve may consist of a simple flapper valve located on a bottom interior surface of the reservoir and operated by a remotely controlled actuator, for example. A flapper valve typically includes a base plate having an outlet therein, a flat flapper member disposed over-top of the base plate so as to block the outlet, and a hinge connected between an edge of the flapper member and the base plate to hingeably connect the flapper member to the base plate permitting the flapper member to alternately block and expose the outlet. While such a valve is mechanically simple and robust, it may have significant shortcomings.

In fire-fighting buckets, it may be desirable to place the valve at the bottom of the reservoir so as to permit the reservoir to be completely drained therethrough. In this location, the force of the full head of water in the reservoir resists the hinging of the flapper member and thereby resists the opening of the flapper valve. The resistive force increases directly as the area of the flapper member. Therefore, if a flapper valve having a reasonably large flapper member is provided, such that the reservoir may be dumped reasonably quickly, a fairly powerful motor may be required to actuate the flapper, resulting in increased weight and power consumption. Furthermore, the operation of the valve may create turbulent flow, causing the water to disperse laterally as it is dumped. As previously stated, one edge of the flapper member may be hingeably connected to the base portion. Therefore, when the flapper valve is opened, water may be blocked by the hinged edge while being permitted to flow to the outlet past the remaining edges. This may create unbalanced flows and turbulence. This effect may be exacerbated if the valve is opened only part way so as to operate as a metering valve. In fire-fighting, lateral dispersal may be undesirable as the water may be more susceptible to evaporation before reaching the ground and also because some of the water may overshoot the desired target.

Lastly, a flapper valve may not be adequately controllable to rapidly shut off the flow of water to permit multiple dumps, for example. When the valve is open, hydrostatic forces acting on the flapper member may tend to keep the valve open, canceling some of the hydrodynamic forces caused by the outflow of water which may tend to close the valve. Furthermore, the turbulence caused by the valve, as previously described, may further cancel the hydrodynamic forces. Such cancellations may slow the closure of the valve, causing the operator to dump a larger volume water than necessary, possibly the entire bucket load, in a location regardless of whether or not the full volume of water is required at that location.

Some existing buckets may use a butterfly valve in place of the flapper valve. A butterfly valve typically includes a longitudinally extending axle having first and second coplanar plates extending laterally therefrom. The butterfly valve may be connected to a bottom portion of the bucket and located in an opening therein. When closed, the first plate may seal against an interior surface of the bucket while the second plate may seal against an exterior surface of the bucket. The valve may be opened by rotating the first and second plates about the axle and may be fully opened by rotating the plates to a position perpendicular to their closed position. While the butterfly valve is hydrodynamically balanced, it may tend to cause lateral dispersal when operated as a metering valve and may be difficult to seal as one plate may be located inside the bucket and the other plate may be located outside the bucket.

Furthermore, both butterfly valves and flapper valves may tend to provide relatively poor seals as they may use flat gaskets which may only resist fluid flow directed normally to a plane of the gasket and which may permit fluid leakage directed parallel the plane of the gasket.

SUMMARY OF THE INVENTION

In one aspect, the invention provides a valve having an outer assembly and an inner assembly in which the outer assembly is moveable between open and closed positions, and the outer assembly has a reduced surface area on those surfaces which are disposed normally to a direction of movement. The outer assembly is thereby adapted to be less affected by hydrostatic and hydrodynamic forces directed so as to oppose its movement.

In accordance with one aspect of the invention there is provided a valve which may be housed in a fluid reservoir. The valve may include an inner assembly having a spaced apart top plate and base plate, and a substantially open side portion. The valve may also include an outer assembly with solid side walls that are complementary to the inner assembly. The outer assembly may be movable with respect to the inner assembly between an open position and a closed position so that an upper portion of the solid side walls sealably cooperate with the top plate only when the outer assembly is in the closed position, and a lower portion of the solid side walls sealably cooperate with the base plate only when the outer assembly is in the closed position. In the open position, flow through the valve is permitted through the open side portion and the outlet of the inner assembly. In the closed position, flow through the valve is prevented by sealing engagement between the solid side walls of the outer assembly and the top plate and by sealing engagement between the solid side walls and the base plate of the inner assembly.

In one embodiment of the invention, the valve may be used in a fire fighting device which may be carried to the site of a forest fire by a helicopter. In this embodiment, an operator, located inside the helicopter may send a command to a control head, instructing the control head to open, or partially open, the valve, thereby releasing water from the reservoir onto the fire. In the open and partially opened positions, the valve may be hydrodynamically balanced such that the flow of water may be a coherent stream. Before the reservoir is emptied, the operator may also instruct the control head to close the valve, retaining water in the reservoir for use elsewhere, thus permitting partial dumps.

The following detailed disclosure and drawings disclose several embodiments of the invention, which is capable of expression in structures other than those particularly described and illustrated.

DETAILED DESCRIPTION

Figure 1:
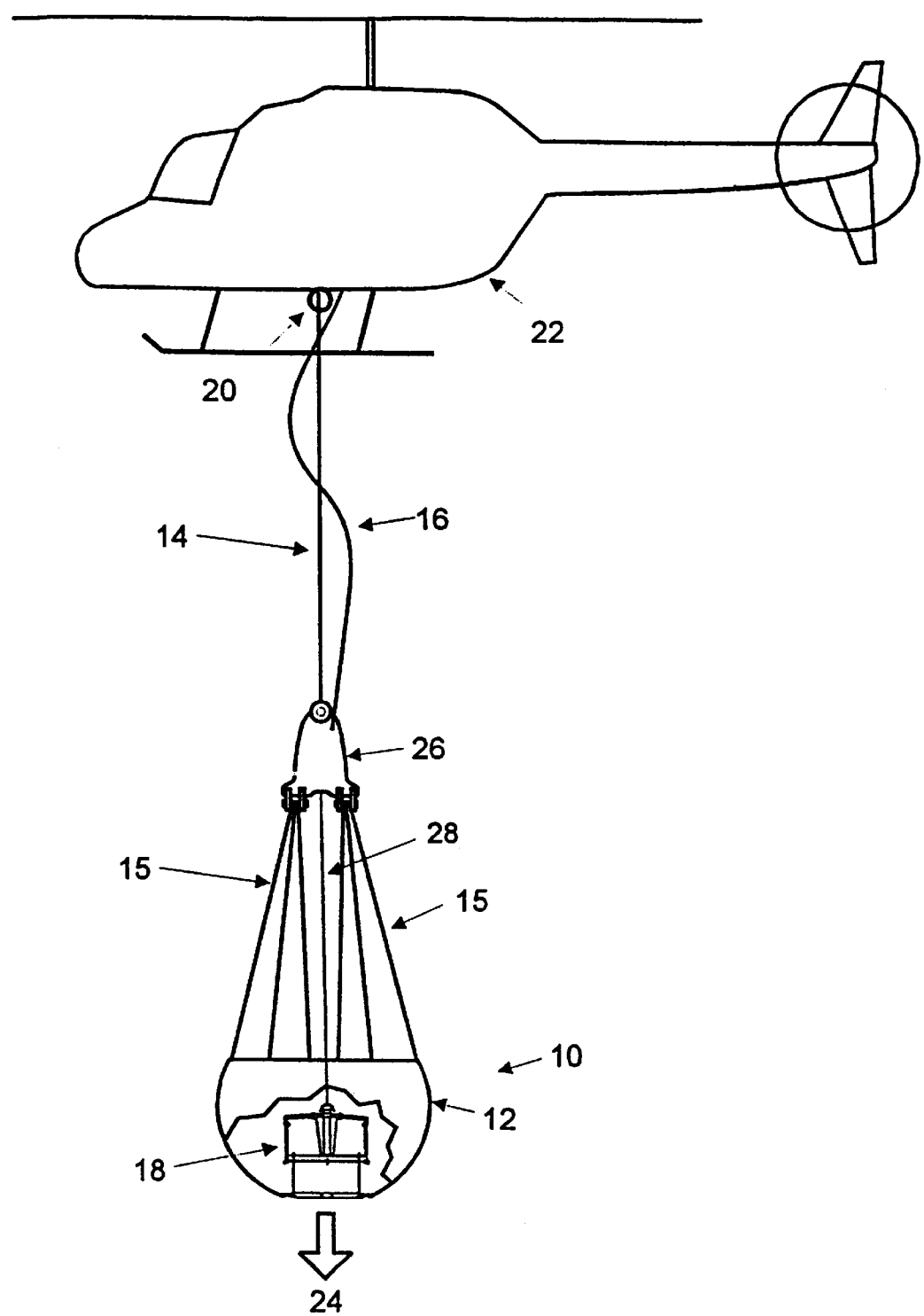
FIG. 1 is a front elevation of a fire-fighting bucket, suspended from a helicopter, according to one aspect of the invention.
Figure 2:
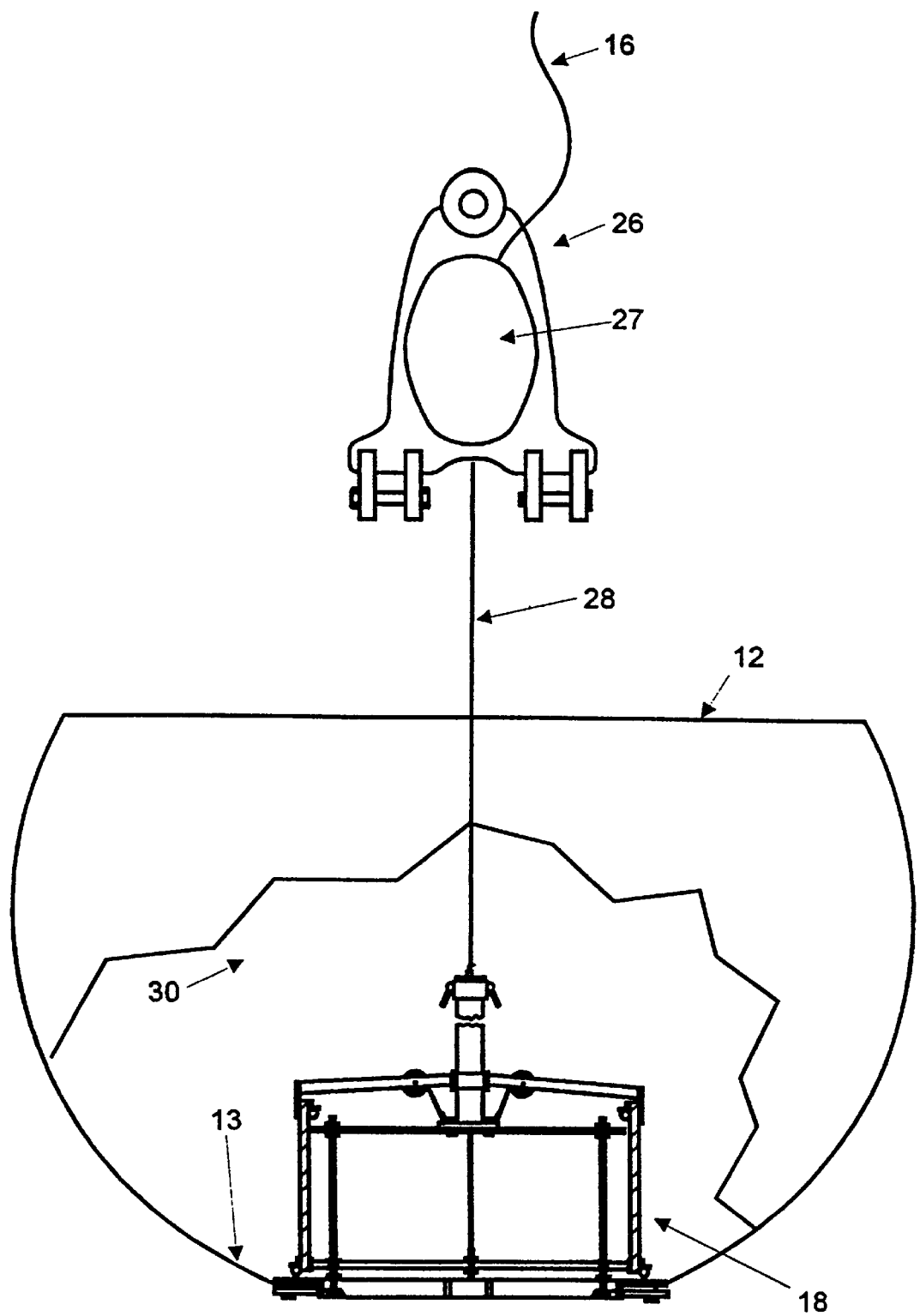
FIG. 2 is a simplified section of the front elevation of the bucket of FIG. 1 showing a valve and a control head.

Referring to FIGS. 1 and 2, a fire-fighting apparatus according to one aspect of the invention is shown generally as 10. The apparatus 10 may include a reservoir 12 for containing a volume of fluid 30. The reservoir 12 may include a bottom interior surface 13 having a valve 18 thereon for controllably releasing a stream 24 of fluid over a fire, for example. The reservoir 12 may be suspended from a control head 26 by support cables 15 and the control head 26 may be suspended from cargo hook 20 of helicopter 22 by support cable 14. A control cable 16 may be connected between the helicopter 22 and the control head 26 to transmit instructions from an operator to the control head 26. The control cable 16 may be an electrical cable, a hydraulic hose, or a pneumatic hose, for example. An actuator cable 28 may be connected between the control head 26 and the valve 18 to enable the control head 26 to open and close the valve 18 in response to operator commands.

Figure 3:
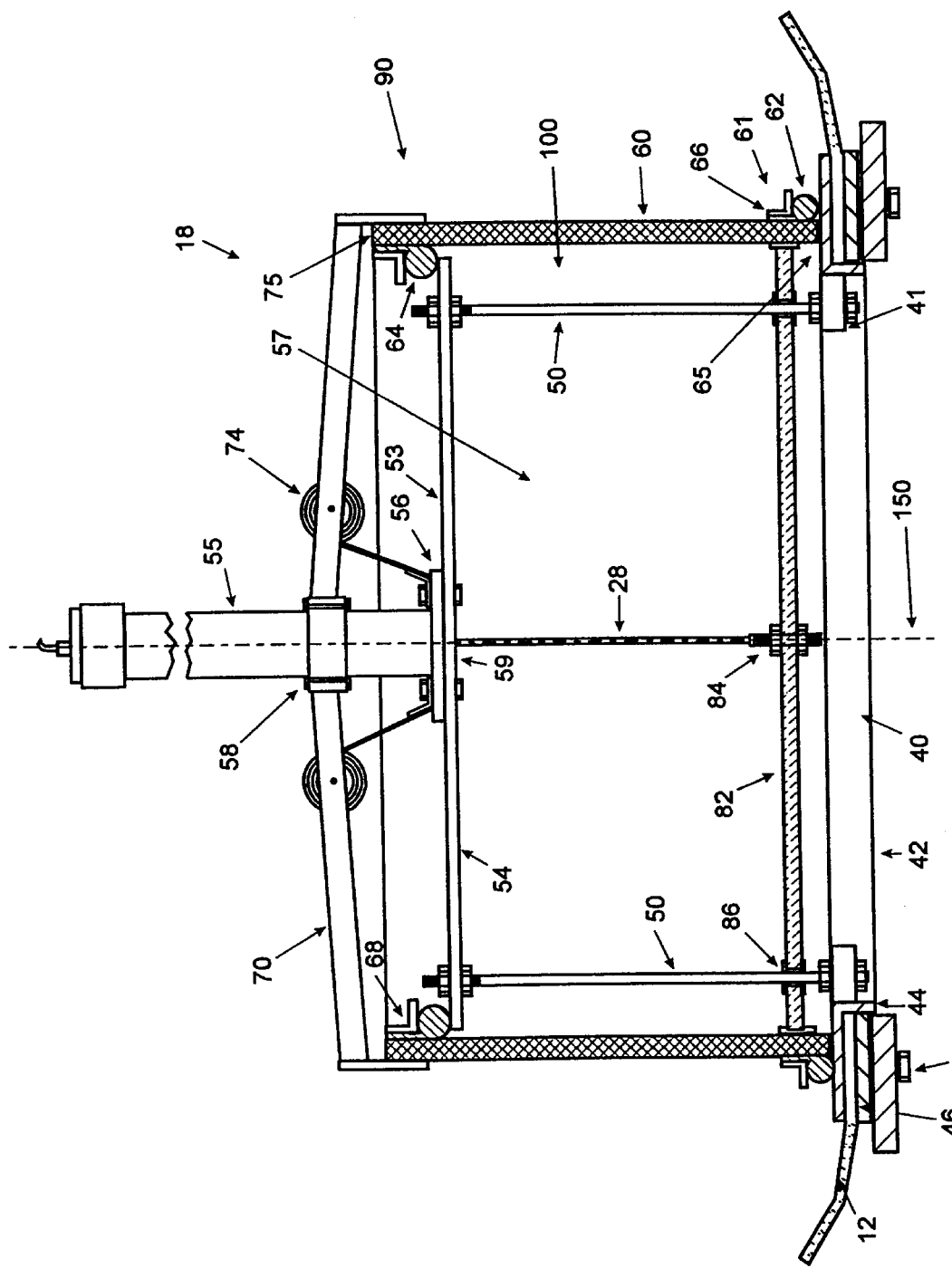
FIG. 3 is a simplified section of the front elevation of the valve of FIG. 2, in a closed position.
Figure 5:
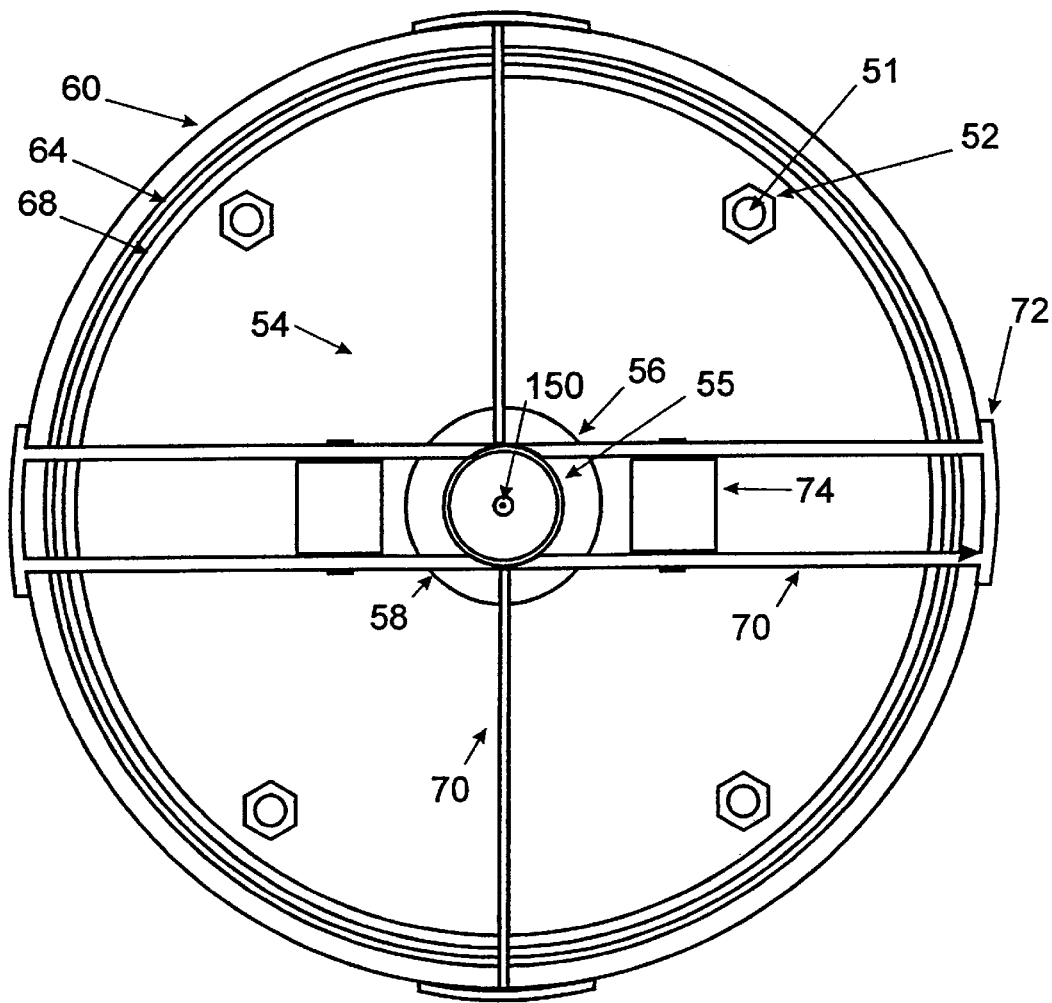
FIG. 5 is a simplified top plan view of the valve of FIG. 2.
Figure 6:
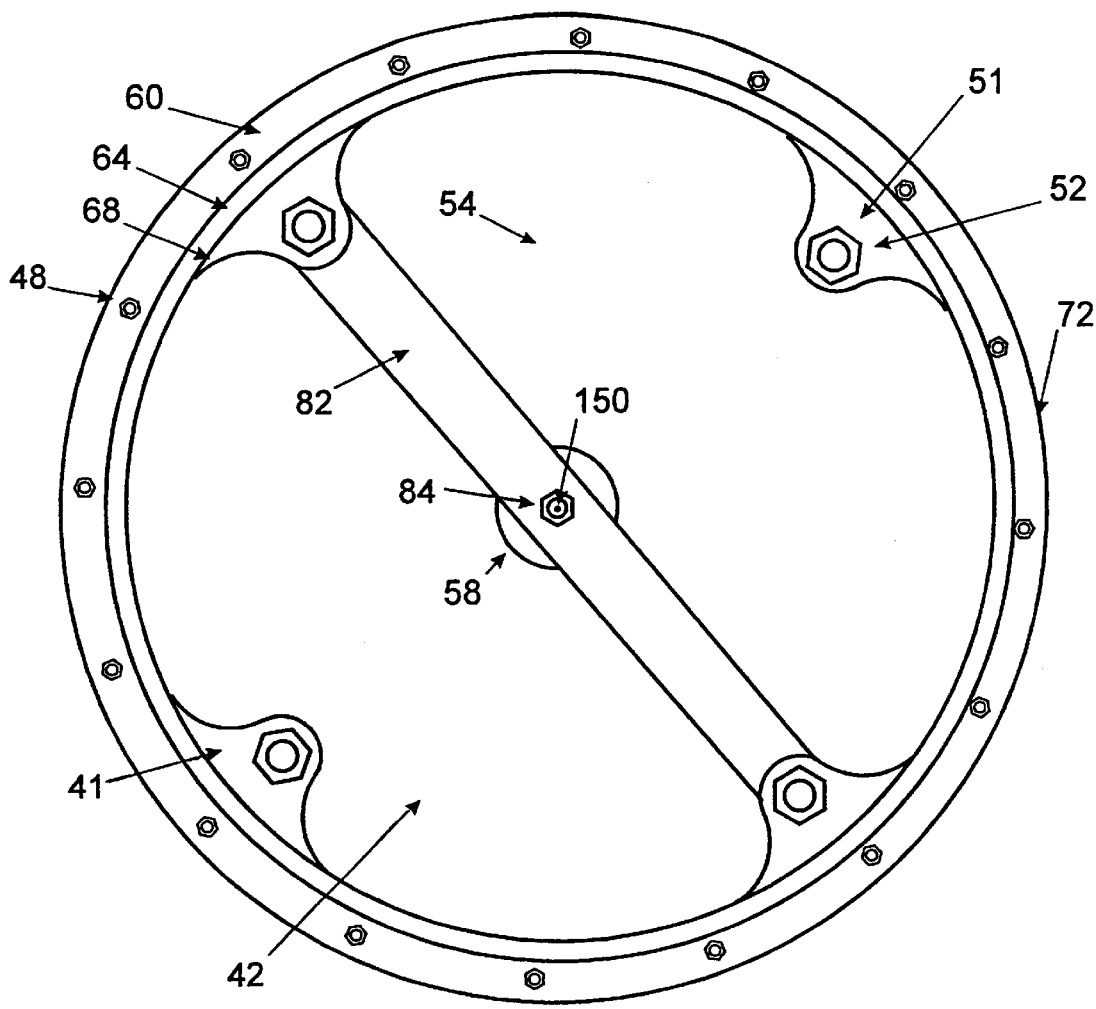
FIG. 6 is a simplified bottom plan view of the valve of FIG. 2.

Referring to FIGS. 3, 5 and 6, valve 18 may have a flat circular base plate 40 having a central circular outlet 42 extending therethrough. A perimeter portion 44 of the base plate 40, which may be L-shaped in cross-section, defines a seat to receive an edge portion of the reservoir 12. A flat annular clamping member 46 may be fastened to the perimeter portion 44 by a plurality of bolts 48, clamping the received edge of the reservoir 12 therebetween to create a substantially waterproof seal between the valve and the reservoir.

A plurality of support members 50 may extend rigidly and perpendicularly from an interior surface 41 of the base plate 40. A top plate 54, which in one embodiment of the invention defines a circular perimeter, may be rigidly connected to distal ends of the support members 50 so as to be substantially parallel to the base plate 40, thereby defining an open-sided cylinder therewith. A guide post 55 may extend from an outer surface 53 of top plate 54, the guide post preferably being hollow and being connected substantially perpendicularly thereto by flange 56 disposed about an opening 59 in top plate 54.

Base plate 40 and top plate 54 may together define an inner assembly 100 of the valve 18, which may further include support members 50, guide post 55 and flange 56.

An outer assembly 90 comprises solid side walls 60 having first and second open ends 63 and 65. Side walls 60 may be cylindrical and may be disposed substantially concentrically about top plate 54. The outer assembly is movable with respect to the inner assembly between an open position shown in FIG. 4, and a closed position shown in FIG. 3. An upper portion 75 of solid side walls 60 may be adapted to sealably cooperate with top plate 54 only when outer assembly 90 is in the closed position (FIG. 3). A lower portion 61 of solid side walls 60 may be adapted to sealably cooperate with base plate 40 only when the outer assembly is in the closed position. In the open position (FIG. 4) flow through valve 18 is permitted through open side portions 49 and outlet 42 of inner assembly 100. In the closed position (FIG. 3) fluid flow through valve 18 is prevented by sealing engagement between solid side walls 60 of outer assembly 90 and top plate 54 and base plate 40 of inner assembly 100. Annular collar 58 may be slidably located around guide post 55 and rigidly connected to side walls 60 by diametrically aligned spacer arms 70. A plurality of spacer arms 70 may be connected to the inner assembly 100 by constant force tension springs 74. The tension springs 74 may assist in closing the valve when the reservoir 12 is empty as will be further described. When the reservoir 12 contains fluid, the hydrodynamic pressure from the outflow stream 24 may be sufficient to close the valve. It will be appreciated that alternative means may be provided to urge the outer assembly into the closed position with respect to the inner assembly, such as a variety of resilient members or springs connecting the outer assembly and the inner assembly.

To adapt lower portion 61 of side walls 60 to sealably cooperate with base plate 40, a lower O-ring 62 may be disposed around an outer perimeter of the lower portion 61 of side walls 60. Engagement between lower O-ring 62 and perimeter portion 44 of base plate 40 provides a substantially waterproof seal between the side walls 60 and base plate 40 when the valve is closed. A first hoop fastener 66 which may be L-shaped in cross-section, may be disposed around the outer perimeter of the lower portion 61 of side walls 60 to fasten lower O-ring 62 thereto. The shape of first hoop fastener 66 may be adapted to protect lower O-ring 62 from damage.

To adapt upper portion 75 of side walls 60 to sealably cooperate with top plate 54, upper O-ring 64 may be disposed around an inner perimeter of the upper portion 75 of side walls 60. Engagement between upper O-ring 64 and top plate 54 provides a substantially waterproof seal between side walls 60 and top plate 54 when the valve is closed (FIG. 3). A second hoop fastener 68 which may be L-shaped in cross-section, may be disposed around the inner perimeter of the upper portion 75 of side walls 60 to fasten upper O-ring 64 thereto, and to protect the upper O-ring 64 from damage. The distance between first and second O-rings 62 and 64 may be selected to be substantially equal to the distance between base plate 40 and top plate 54 to permit both O-rings to form respective seals substantially simultaneously when valve 18 is closed. In some embodiments, O-rings 62 and 64 do not bear on any surface when valve 18 is opened, so that wear on O-rings 62 and 64 is reduced.

Lifting member 82 may be disposed across an interior diameter of the side walls 60, connected to interior faces of side walls 60, preferably at the lower portion 61 of side walls 60. Lifting member 82 may define a plurality of openings therethrough having guide bushings 86 therein. Guide bushings 86 may be disposed coaxially about respective support members 50 and slidably connected thereto. A cable connection 84, which may comprise a screw-threaded cable adjuster/connection, may be disposed on lifting member 82. In a cylindrical embodiment of valve 18, cable connection 84 may be at a centre-point on lifting member 82 and may be concentric with cylindrical side walls 60. A first end of actuator cable 28 may be connected to cable connection 84 and the actuator cable disposed to extend therefrom through an opening 59 in top plate 54 and through guide post 55, a second end of the actuator cable 28 being connected to control head 26 as will be further described.

The side walls 60, the annular collar 58, the spacer arms 70, the O-rings 62 and 64, the hoop fasteners 66 and 68 and the lifting member 82 comprise the outer assembly 90 of the apparatus.

Referring to FIGS. 2 and 3, the valve 18 is shown in a closed position, such that the lower portion 61 of side wall 60 is adjacent the base plate 40 and the upper portion 75 of the side wall is adjacent the top plate 54. In this position, lower O-ring 62 may be held in close contact with the interior surface 41 of base plate 40 to form a substantially fluid-tight seal therewith about the whole of the outside perimeter of lower portion 61. Similarly, upper O-ring 64 may be held in close contact with the outer surface 53 of top plate 54 to form a substantially fluid-tight seal therewith about the whole of the inside perimeter of upper portion 75 of side wall 60. Furthermore, the constant force tension springs 74 may exert forces which urge outer assembly 90 towards inner assembly 100, thereby forcing the upper and lower O-rings 62, 64 into close contact respectively with top plate 54 and the base plate 40, thereby creating improved waterproof seals.

Figure 7:
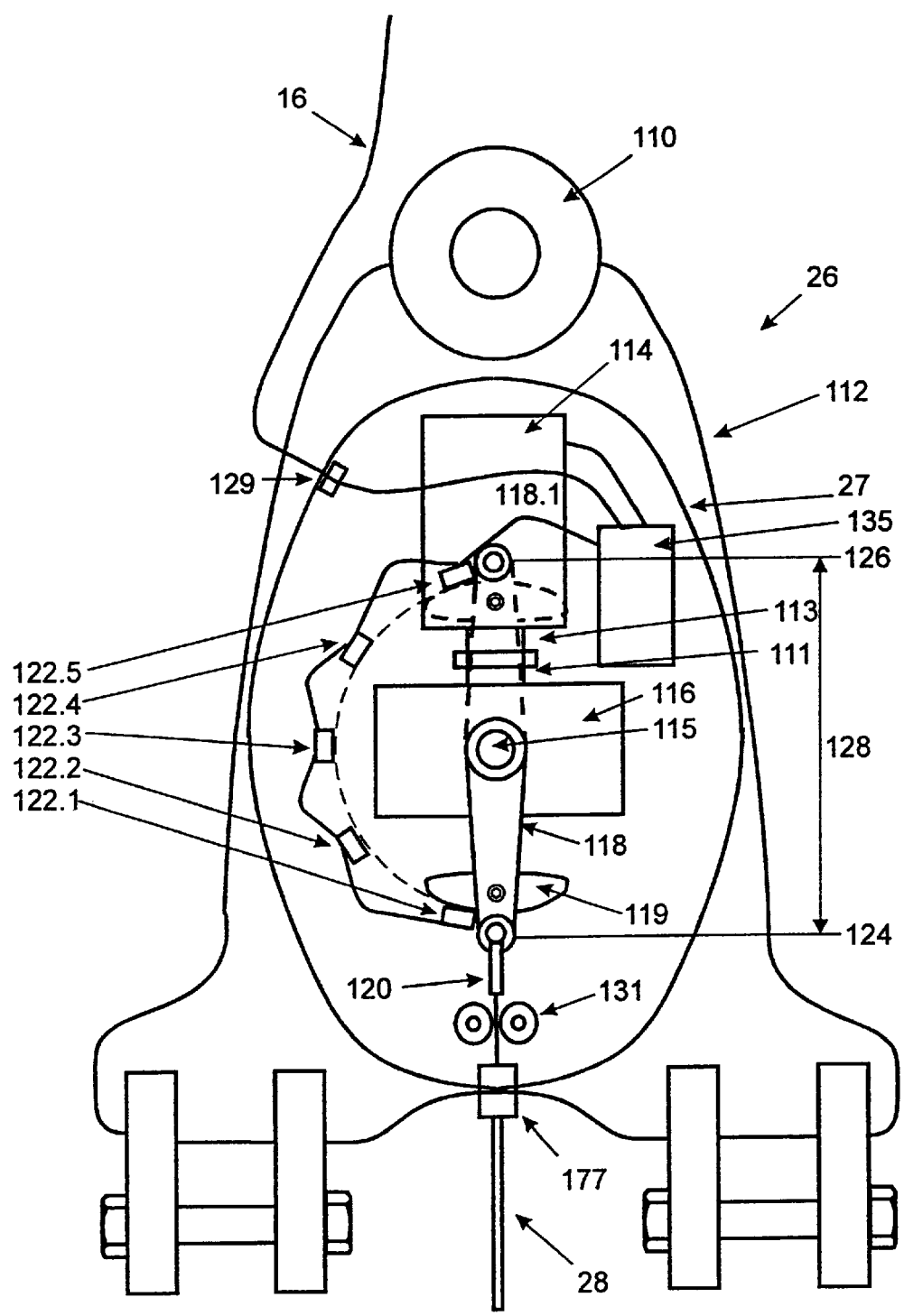
FIG. 7 is a simplified section of a front elevation of the control head of FIG. 2.

Referring to FIGS. 1 and 7 the control head is shown generally at 26. The control head may include an attachment portion 110 whereby the control head may be connected to support cable 14. A control-head-plate 112 may extend from the attachment portion 110 to locate components of the control head as will be herein described. A DC electric motor 114 and reduction gear 116 may be rigidly connected to the control-head-plate 112. The DC motor 114 may be electrically connected to a motor control unit 135 located on the control-head-plate 112 to receive electrical power therefrom as will be further described. A rotor shaft 113 of the motor 114 may be connected to a collinearly disposed input shaft 111 of the reduction gear 116 so as to drive input shaft 111. A cable pull arm 118 may be connected to a high torque output shaft 115 of the reduction gear 116 to produce rotary motion of a distal end of the cable pull arm 118 in response to rotation of the high torque output shaft 115. A cable connector 120 may be pivotally connected to the distal end of cable pull arm 118 and connected to the second end of actuator cable 28 whereby the second end of the actuator cable 28 may be made to rotate with the cable pull arm 118 about the output shaft 115. A pair of rollers 131 may be located adjacent the actuator cable 28 to limit lateral movement of the actuator cable and to produce substantially linear motion of a length of actuator cable 28 extending between said rollers 131 and said lifting member 82 in response to rotational motion of the cable pull arm 118. A plurality of positional sensors 122.1, 122.2, 122.3, 122.4, 122.5 may be located adjacent the cable pull arm 118 to sense the relative position thereof. In one embodiment of the invention, the positional sensors comprise micro-switches which are operable by a cam 119 connected to the cable pull arm 118. Alternatively, the positional sensors may be reed switches, Hall effect sensors, photo transistors, magnetic sensors or any of the other sensors which are known in the art. Motor control unit 135 may be connected to control cable 16 to receive DC power from a remote power source (not shown) located in helicopter 22 and to receive operator instructions. Motor control unit 135 may also be connected to positional sensors 122.1, 122.2, 122.3, 122.4 and 122.5 to obtain positional feedback therefrom. The motor control unit 135 may be connected to DC motor 114 to provide controlled DC power thereto so as to control the rotation thereof in response to the operator instructions and the positional feedback from the positional sensors. The waterproof housing 27 may be disposed to enclose the components of the control head to permit the control head 26 to be immersed in water, such that the control cable 16 and the actuator cable 28 enter the housing through waterpoof seals.

Figure 8:
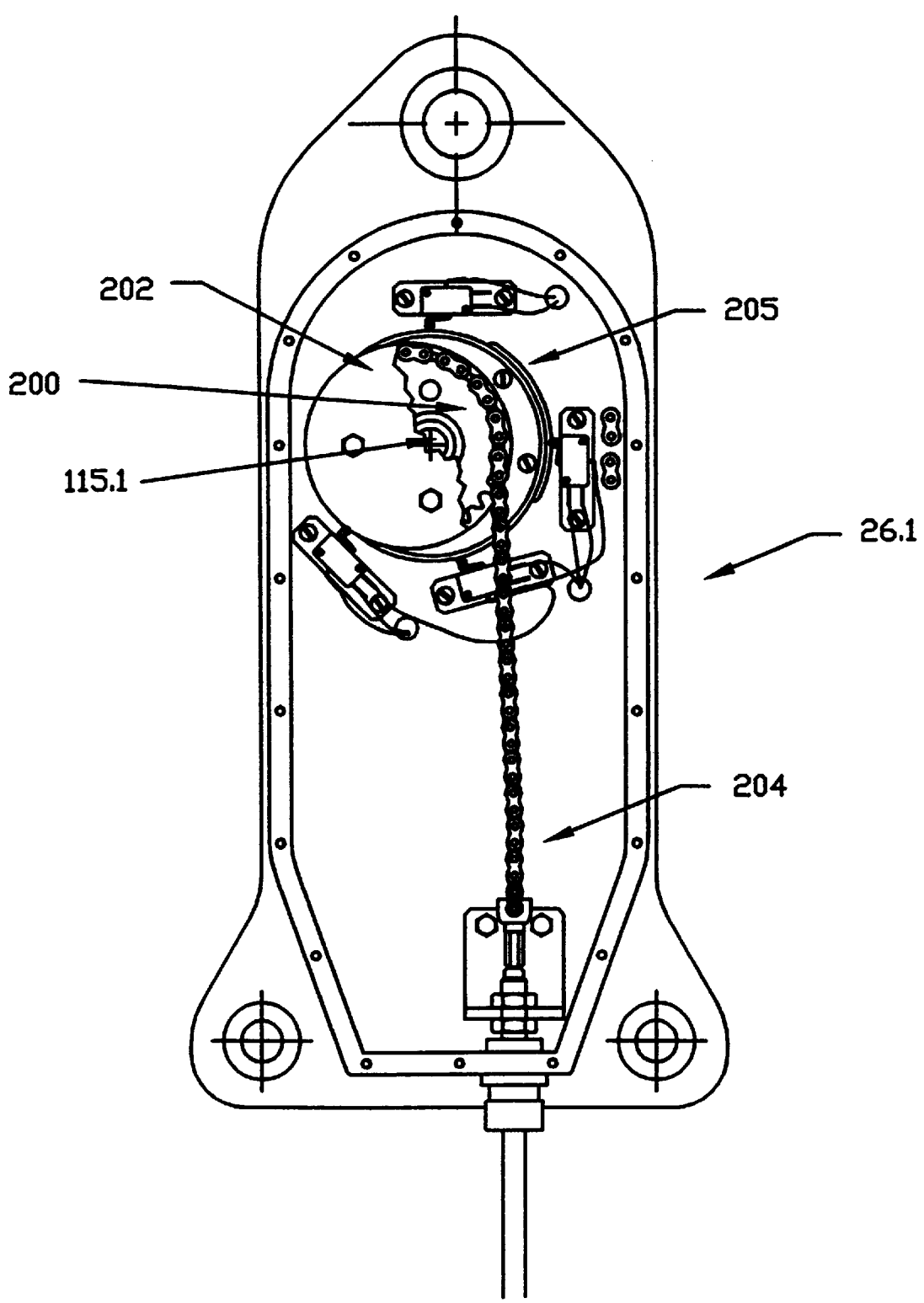
FIG. 8 is a simplified section of a front elevation of an alternative control head employing a chain and sprocket to actuate the valve.

Referring to FIG. 8, an alternative control head is shown generally at 26.1 In this embodiment, cable pull arm 118 has been replaced with a chain-sprocket 200. The sprocket 200 may be circular and may be mounted eccentrically about reduction gear output shaft 115.1. A connecting chain 204 may be connected to the sprocket 200 and disposed to extend over a partial perimeter of the sprocket so as to engage sprocket teeth . A distal end of the chain 204 may be connected to actuator cable 28 to transmit force to the actuator cable and the outer portion of the valve as previously described. The eccentric sprocket may be mounted so as to provide greater leverage when the valve is in a fully closed position, and less leverage as the valve is opened, an arrangement which corresponds to the water-loads which must be overcome to open the valve. A circular plate 202, having a diameter larger than the sprocket 200 may be mounted eccentrically on output shaft 115.1 so as to describe a substantially identical path as sprocket 200 and may serve as a chain guard to keep the chain on the sprocket. A cam 205 mounted concentric with the shaft may serve to actuate positional sensors disposed as previously described.

OPERATION

Referring to FIGS. 1, 2 and 3 the helicopter may carry a reservoir containing volume of water 30 to the site of a fire, the volume of water being retained in the reservoir by valve 18 which may be maintained in a closed position to prevent water from reaching outlet 42.

The design of the valve and the use of O-rings in place of flat gaskets may provide improved seals reducing water losses. When the valve is in a closed position, the top plate 54, the base plate 40 and the side walls 60 may define a closed-sided cylindrical chamber 57 which may be in communication with the surrounding environment through outlet 42, but which is separated from the reservoir by fluid-tight seals. The reservoir 12 may be open at the top such that when the reservoir contains water, hydrostatic pressure in the reservoir is greater than atmospheric pressure by an amount equal to the head of water in the reservoir. The cylindrical chamber 57 may be in communication with the atmosphere through outlet 42 and therefore may be at atmospheric pressure. Therefore, the pressure in the reservoir may be higher than the pressure in cylindrical chamber 57 and may tend to urge O-rings 62 and 64 into respective openings between the outer and inner assemblies 90 and 100 of the valve, creating improved waterproof seals therebetween.

Referring to FIGS. 1 and 7, a signal may be sent from the helicopter 22 to the control head 26 along control cable 16 to instruct the control head to open valve 18. The signal, which may include DC electrical power, may be sent to motor control unit 135 to control DC motor 114 to produce rotary motion of shaft rotor 113. The rotary motion of the rotor shaft 113 may be used to drive input shaft 111 of the reduction gear 116. The reduction gear may convert the high speed, low torque output of the DC motor 114 into a low speed, high torque output at its output shaft. The cable pull arm 118 connected to the output shaft 115 of the reduction gear 116 may thereby be made to rotate at reduced RPM with respect to the rotor shaft 113 of DC motor 114. By controlling the rotation of the DC motor 114, the distal end of cable pull arm 118 may be moved from a point of minimum distance 124 from the valve 18 to a point of maximum distance 126 from the valve by causing the cable pull arm to rotate through an angle of 180 degrees. A distance 128 between these points 124 and 126 corresponds to a maximum linear travel of the cable connector 120 and actuator cable 28 which are pivotally connected to the cable pull arm 118. In one embodiment of the invention, the distal end of the cable pull arm describes a circle having a diameter of approximately 9 inches so as to permit a maximum linear travel of the actuator cable 28 of approximately 9 inches.

The positional sensors 122.1, 122.2, 122.3, 122.4, 122.5 may be located to detect predetermined positions of the cable pull arm. For example, the sensor 122.1 may be located to detect when the cable pull arm is at the point of minimum distance 124; sensor 122.5 may be positioned to detect when the cable pull arm is at the point of maximum distance 126; and sensors 122.2, 122.3, 122.4 may be positioned to detect when the cable pull arm is at positions ⅓, ½, and ⅔ of the distance therebetween, respectively. This positional information may be used as feedback by the motor control unit 135 to control the rotation of DC motor 114 and may be transmitted to the helicopter 22 along control cable 16 to provide such positional information to the operator.

Figure 4:
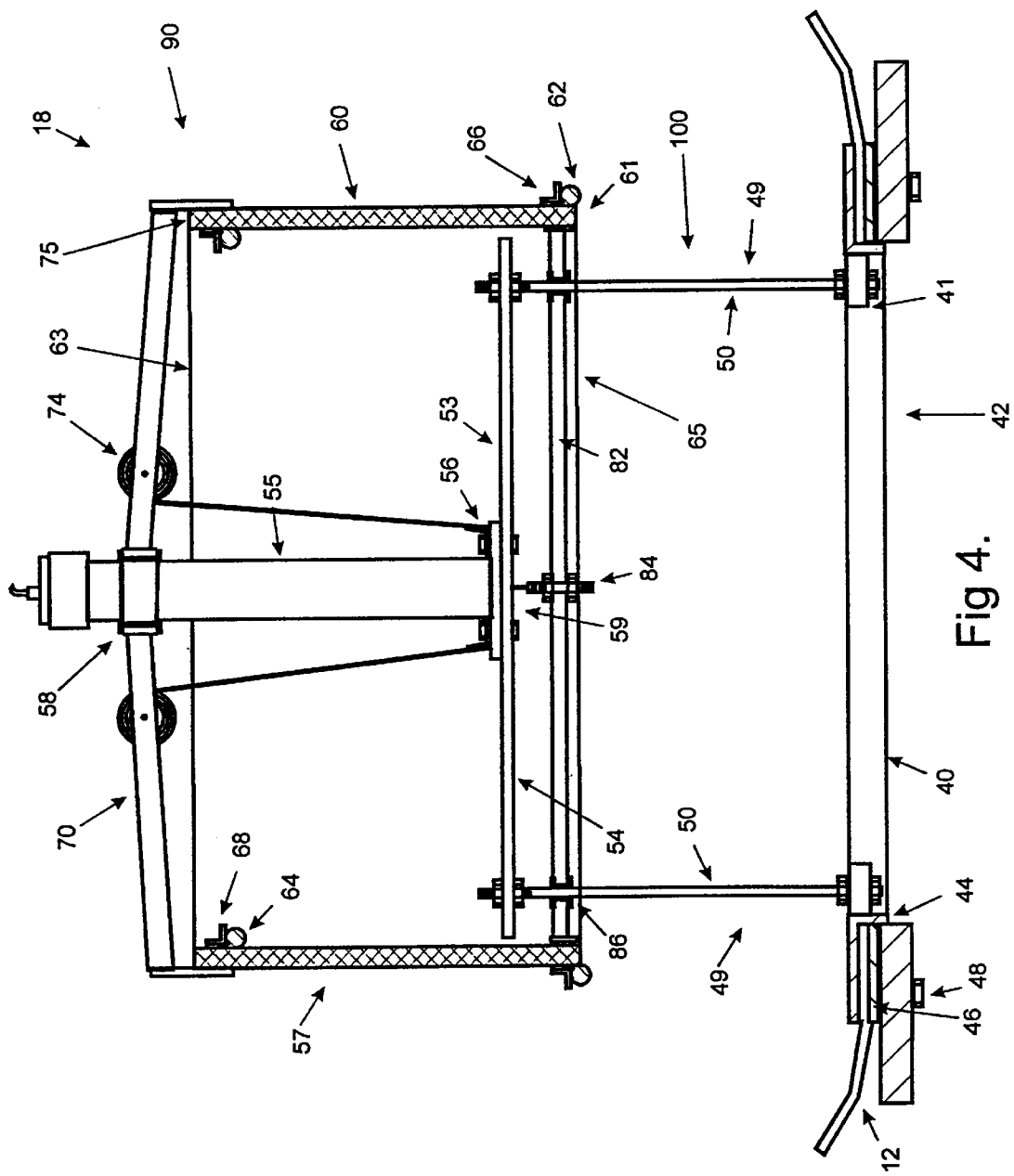
FIG. 4 is a simplified section of the front elevation of the valve of FIG. 2 in a fully opened position.

Referring to FIGS. 4 and 7, the cable pull arm may be rotated from point 124 to point 126 so as to move the cable connector 120 and actuator cable 28 upwardly by the maximum linear travel. The first end of the actuator cable 28 may be connected to the lifting bar 82, such that the upward motion of the actuator cable 28 is transmitted to the lifting bar 82 and thereby to the outer assembly 90 of the valve. Therefore, the positional information about the cable pull arm 118 may correspond to linear positional information about the cable connector 120, the actuator cable 28 and the outer assembly 90. The operator may therefore use the positional information provided by the positional sensors 122.1, 122.2, 122.3, 122.4, 122.5 to control the DC motor 114 so as to stop the outer assembly 90 at a position intermediate fully closed and fully opened positions, whereby the valve may be controlled to permit a reduced or partial flow of fluid from the reservoir.

The valve may be designed to reduce forces which oppose movement of the outer assembly. For example, the outer assembly 90 may be slideably mounted on support members 50 and guide post 55 and guided by bushings 86 and collar 58 such that the outer assembly 90 may slide under the influence of the actuator cable without undue friction or racking. The spacer arms 70 and the lifting member 82 may be essentially the only parts of the outer assembly 90 which may be disposed generally perpendicularly to the direction of travel of the outer assembly 90. Therefore, hydrostatic and hydrodynamic forces acting on the surfaces of these portions may be the only hydrostatic and hydrodynamic forces tending to resist the movement of the outer assembly. The lifting member 82 and connector arms 70 may have substantially reduced surface areas, as compared to a flapper valve for example, such that hydrostatic and hydrodynamic forces thereon will be correspondingly reduced. An increase in the size of the outlet 42 and a corresponding increase in the size of the valve may produce a relatively small increase in the surface areas of lifting member 82 and connector arms 70. Because the hydrostatic and hydrodynamic forces resisting movement of the outer assembly may be relatively small, the DC motor 114 may therefore be relatively small, permitting a reduction in weight and power requirements.

In one embodiment, the valve 18 may be substantially symmetrical about a vertically extending central axis 150 extending through the centre of outlet 42 such that water may flow transversely towards the outlet 42 from all directions equally. Therefore, the transverse or horizontal components of respective flows may substantially cancel one another, reducing turbulence and producing an output stream 24 which may be substantially coherent and vertically directed. Turbulence may be further reduced due to the fact that in an open or partially open position, there may be few obstructions to block water flow. The support members 50 may have relatively small cross-sections and correspondingly small surface areas. Additionally, the support members may have rounded profiles to reduce turbulence.

At any time, the operator may signal the motor control unit 135 to close the valve. The motor control unit may close the valve by reversing the polarity of the DC power thereby reversing the direction of rotation of DC motor 114, the reduction gear and cable pull arm 118 and reversing the direction of linear travel of the cable connector 120 and actuator cable 28. Alternatively, the cable pull arm may be permitted to describe a full circle, thereby returning to the point of minimum distance 124, the cable connector 120 and actuator cable 28 automatically reversing their direction of travel as the cable pull arm moves from the point of maximum distance 126 back towards the point of minimum distance 124. If the cable pull arm is permitted to describe a complete circle, additional positional sensors may be required to detect the position of the cable pull arm over the entire circle so described. Regardless of control method, when the actuator cable 28 reverses direction, it may stop exerting a force on lifting member 82, permitting the outer assembly 90 to return relatively quickly to the closed position under the influence of its own weight and the spring force generated by the constant force tension springs 74. Hydrostatic and hydrodynamic forces acting to resist movement of the outer assembly may be minimal, being mostly directed normally to the direction of travel such normal forces being cancelled by equal and oppositely directed normal forces due to the substantially symmetrical design of the valve. By closing the valve 18 before the reservoir is empty, the operator may use the apparatus to perform controlled partial dumps whereby only a portion of the total volume of water 30 is dropped in a location, the remained being used elsewhere. By partially closing the valve 18, the operator may control the valve to permit reduced fluid flows, as required.

The operator may control the valve to permit the apparatus to be refilled at a lake or river, for example, by opening the valve of the now empty reservoir and lowering the reservoir into the lake. The apparatus will tend to sink under its own weight and will thereby force water into the reservoir. When the reservoir is sufficiently full, the operator may signal the motor control unit 135 to close the valve, thereby sealing the water into the reservoir. The helicopter may then lift the apparatus out of the lake and repeat the dump/fill cycle as needed. When filly immersed, water will fill both the reservoir 12 and the cylindrical chamber 57 such that forces on the outer assembly 90 may be balanced such that there is insufficient downward pressure on the outer assembly to form a good seal with the inner assembly 100. For this reason, tension springs 74 may be included to apply a biasing force between the inner assembly 100 and outer assembly 90. As the apparatus is lifted clear of the lake, the fluid in chamber 57 will drain out through outlet 42, creating an unbalanced hydrostatic force on the outer assembly 90 which may tend to further seal the outer assembly to the inner assembly.

ALTERNATIVES

While a specific embodiment and application of the invention has been disclosed, the invention encompasses many alternative embodiments and applications. For example, while an embodiment of valve 18 is cylindrical in shape, other shapes may be used. The valve may be made of metal plate welded into a cube or prism, for example. In such a valve, the base plate 40 and top plate 54 may define square plates separated by support members 50 to define an open-sided cube, for example. The side walls 60 of such a valve may be in an open ended box configuration. The valve may be further modified by making the base plate 40 funnel-shaped or in the shape of an inverted pyramid, for example. Alternative shapes may be useful to adapt the valve of the invention for alternative uses, such as for regulating the flow of particulate solids in railway hopper cars or agricultural hoppers, for example. The tension springs and actuator cable may be replaced with a hydraulic or pneumatic cylinder where an appropriate hydraulic or pressurized air supply is available. Support members 50 may be extended beyond top plate 54 to act as guide rods for the outer assembly 90 and may thereby replace guide post 55 and flange 56. Alternatively, a plurality of U-channel tracks may be disposed to extend between top and base plates 54 and 40 respectively, and complementary guide rollers attached to an inner surface of side walls 60 such that the guide rollers may act as a roller bearing to facilitate the movement of the outer portion 90 with respect to the inner portion 100 while the U-channel tracks may provide alignment and prevent racking. Further mechanical equivalents will be apparent in which elements of the valve are replaced by parts that perform substantially the same function in substantially the same way to achieve substantially the same result, and such equivalents are within the scope of the present invention.

What is claimed is:

1. A valve comprising:
   a) an inner assembly comprising a base plate spaced apart from a top plate, the base plate and the top plate defining therebetween an open side portion of the inner assembly, the base plate defining an outlet; and,
   b) an outer assembly comprising solid side walls, the outer assembly being movable with respect to the inner assembly between an open position and a closed position, an upper portion of the solid side walls being adapted to sealably cooperate with the top plate only when the outer assembly is in the closed position, a lower portion of the solid side walls being adapted to sealably cooperate with the base plate only when the outer assembly is in the closed position, wherein in the open position flow through the valve is permitted through the open side portion and the outlet of the outer assembly, and in the closed position flow through the valve is prevented by sealing engagement between the solid side walls of the outer assembly and the top plate and by engagement between the solid side walls and the base plate of the inner assembly.

2. The valve of claim 1 further comprising:
   a) a lifting member connected to the side walls of the outer assembly and disposed across an interior diameter of the side walls;
   b) an actuator cable connected to the lifting member for moving the outer assembly between the open and the closed positions; and,
   c) a hollow guide post attached to the top plate, disposed about an opening in the top plate, wherein the actuator cable passes from the lifting member through the opening in the top plate and through the guide post out of the valve.

3. The valve of claim 2 further comprising:
   a) a collar slidably mounted on the guide post; and,
   b) spacer arms connecting the collar to the side walls.

4. The valve of claim 2, wherein a rigid support member extends between the top plate and the base plate to maintain the spaced apart relation of the top plate and the base plate, and the rigid support member extends through a guide bushing in the lifting member.

5. The valve of claim 3, wherein a rigid support member extends between the top plate and the base plate to maintain the spaced apart relation of the top plate and the base plate, and the rigid support member extends through a guide bushing in the lifting member.

6. The valve of claim 1 wherein the upper portion of the side walls is provided with an upper gasket on an inner portion thereof to adapt the side walls to sealably cooperate with the top plate, the upper gasket being positioned to sealably engage the top plate when the outer assembly is in the closed position.

7. The valve of claim 1 wherein the lower portion of the solid side walls is provided with a lower gasket on an outer portion thereof to adapt the side walls to sealably cooperate with the base plate, the lower gasket being positioned to sealably engage the base plate when the outer assembly is in the closed position.

8. The valve of claim 5 wherein:
   a) the upper portion of the side walls is provided with an upper gasket on an inner portion thereof to adapt the side walls to sealably cooperate with the top plate, the upper gasket being positioned to sealably engage the top plate when the outer assembly is in the closed position; and,
   b) the lower portion of the solid side walls is provided with a lower gasket on an outer portion thereof to adapt the side walls to sealably cooperate with the base plate, the lower gasket being positioned to sealably engage the base plate when the outer assembly is in the closed position.

9. The valve of claim 1, wherein a perimeter portion of the base plate is adapted to sealably engage a portion of a reservoir and the reservoir is adapted to house the valve.

10. The valve of claim 8, wherein a perimeter portion of the base plate is adapted to sealably engage a portion of a reservoir and the reservoir is adapted to house the valve.

11. The valve of claim 2 wherein the actuator cable is operable by a control head connected thereto to move the outer assembly between the open and closed positions.

12. The valve of claim 10 wherein the actuator cable is operable by a control head connected thereto to move the outer assembly between the open and closed positions.

13. The valve of claim 10 wherein the valve is cylindrical and the top plate is located concentrically within the side walls.

14. The valve of claim 1 further comprising a tension spring connecting the outer assembly and the inner assembly, the tension spring exerting a force urging the outer assembly into the closed position.

15. The valve of claim 3 further comprising a tension spring connecting the spacer arm and the inner assembly, the tension spring exerting a force urging the outer assembly into the closed position.

16. The valve of claim 10 further comprising a tension spring connecting the spacer arm and the inner assembly, the tension spring exerting a force urging the outer assembly into the closed position.

17. The valve of claim 1 further comprising an actuator connected to the outer assembly for controllably moving the outer assembly between the open and the closed positions.

18. The valve of claim 10 wherein the reservoir and the valve are adapted to be suspended from above and the reservoir is adapted to hold a liquid.

* * * * *

UNITED STATES PATENT AND TRADEMARK OFFICE
CERTIFICATE OF CORRECTION

PATENT NO. : 6,192,990 B1
DATED : February 27, 2001
INVENTOR(S) : Pater Leighton Brooke It is certified that error appears in the above-identified patent and that said Letters Patent is hereby corrected as shown below:

<u>Title page,</u>
Item [57], ABSTRACT,
Line 12, change "fluid flows" to -- fluid flowing --.

<u>Column 9,</u>
Line 46, replace "outer" with -- inner --.

Signed and Sealed this

Twenty-second Day of October, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,192,990 B1
DATED : February 27, 2001
INVENTOR(S) : Peter Leighton Brooke It is certified that error appears in the above-identified patent and that said Letters Patent is hereby corrected as shown below:

<u>Title page,</u>
Item [57], ABSTRACT,
Line 12, change "fluid flows" to -- fluid flowing --.

<u>Column 9,</u>
Line 46, replace "outer" with -- inner --.

Signed and Sealed this

Twenty-ninth Day of October, 2002

Attest:

Attesting Officer

JAMES E. ROGAN
*Director of the United States Patent and Trademark Office*